UNITED STATES PATENT OFFICE.

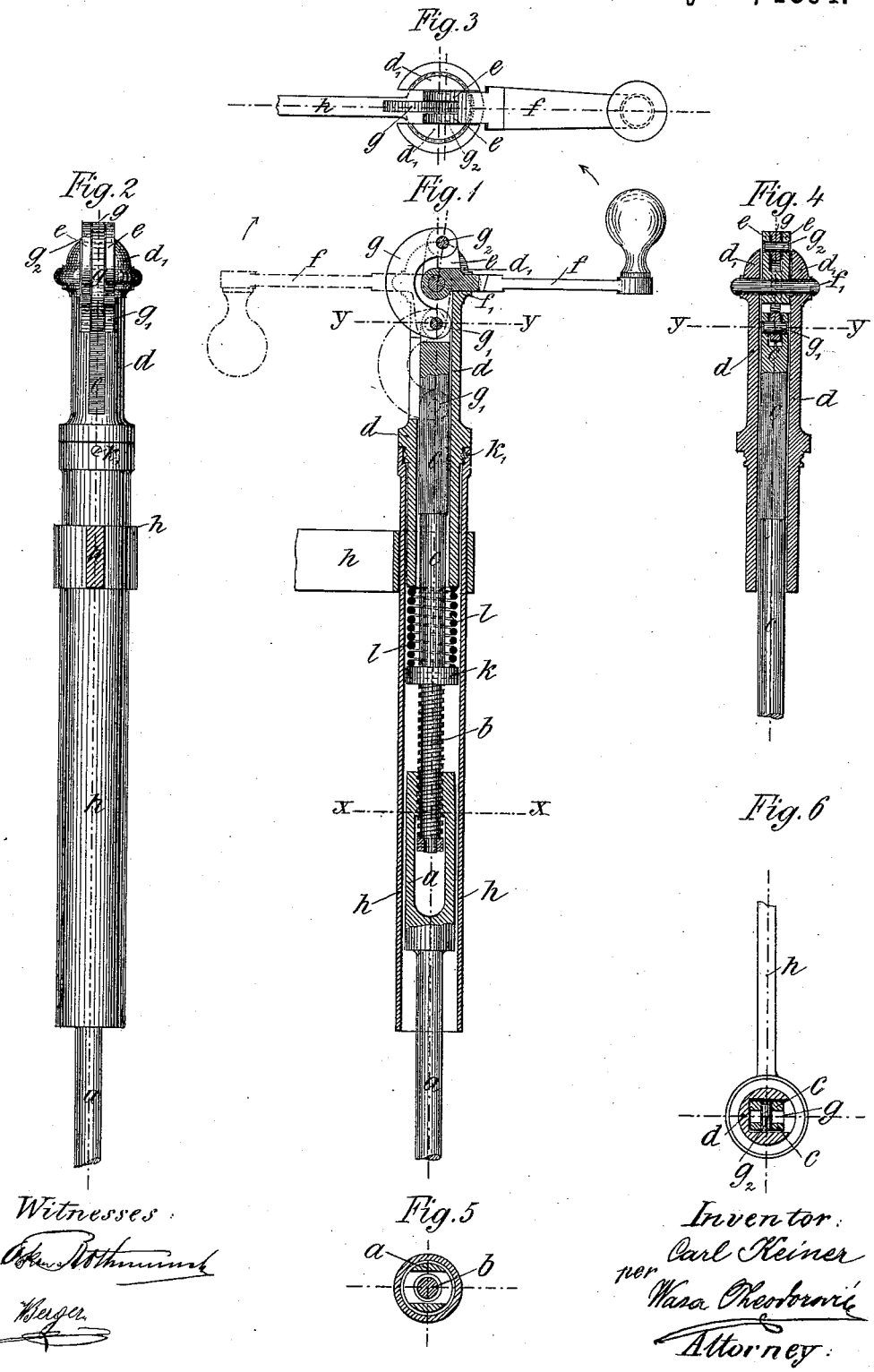

CARL KEINER, OF VIENNA, AUSTRIA-HUNGARY.

CAR-BRAKE.

SPECIFICATION forming part of Letters Patent No. 523,039, dated July 17, 1894.

Application filed October 23, 1893. Serial No. 488,937. (No model.) Patented in Austria-Hungary November 2, 1892, No. 19,212 and No. 42,103, and in France February 28, 1893, No. 228,271.

*To all whom it may concern:*

Be it known that I, CARL KEINER, a subject of the Emperor of Austria-Hungary, residing in the city of Vienna, in the Province of Lower Austria, in the Empire of Austria-Hungary, have invented certain new and useful Improvements in Rapid-Acting Brakes, (for which I have obtained a patent in Austria-Hungary, No. 19,212 and No. 42,103, bearing date November 2, 1892, and in France, No. 228,271, dated February 28, 1893,) of which the following is a specification.

The brake forming the object of this invention and applicable for carriages of any kind, (spring cabs, tramway- and railway-wagons, &c.,) is a screw-brake and has the peculiar feature that the brake-crank may be shifted or laid over in a plane vertical to its rotating-plane about one hundred and eighty degrees and during this motion it displaces the screw or spindle (to which it is articulated) as far as it is necessary to press the brake-blocks by means of the connecting-rods toward the wheels or to remove the same from them. The proper braking or releasing motion of the brake-blocks may be effected in a known manner by turning or rotating the crank and screw-spindle.

The improved quick acting screw-brake is illustrated in the accompanying drawings, in which—

Figure 1 is a longitudinal sectional view of the brake. Fig. 2 is an elevation of the same. Fig. 3 represents the crank with its knob or handle. Fig. 4 is a longitudinal sectional view, partly broken, under an angle of ninety degrees in respect to Fig. 1. Fig. 5 is a cross-section on the line $x\,x$ of Fig. 1. Fig. 6 is a similar view on the line $y\,y$.

The drawing-rod $a$ actuating the brake-block connecting-rods (not shown in the drawings being of any known construction) is connected in a well known manner to the screw-spindle $b$, ending into a prismatic piece $c$ sliding into a socket $d$ and connected by an arc like link $g$ to the forked cam-lever $e$ of the crank $f$.

$g'$ and $g^2$ are pivots connecting the link $g$ on the one side to the spindle rod $c$ on the other side to the eccentric- or cam-lever $e$ of the crank $f$ in an articulated manner.

The crank $f$ is pivoted by means of a transverse-bolt $f'$ in the head $d'$ of the socket $d$ and may be laid over in the direction of the arrow $z$ (see Fig. 1) about one hundred and eighty degrees moving thus the link $g$ from the position illustrated in Fig. 1 in full lines into that shown in dotted lines.

The link $g$ pushes the spindle $c\,b$ axially into the socket $d$ which latter is journaled rotatably in a fixed tube $h$ and is here secured by a pin $k'$ (engaging into an annular groove of the pipe $h$) against axial displacing. By this longitudinal motion of the spindle $c\,b$ the blocks and connecting-rods are moved in such a manner that they remove the brake-blocks away from the wheels.

The brake is operated as follows: At first the brake-crank $f$ is laid over about the bolt $f'$ from the position shown in dotted lines into that represented in full lines. Hereby the link $g$ and the spindle $b\,c$ come also in the position represented in full lines and the brake-blocks are thus brought near or approached to the wheels, or eventually they may even be slightly pressed upon the same.

The proper or tight braking is effected in the ordinary way by turning the crank, which rotates the sockets $d$ into the tube $h$ and together with it spindle-rod $c$ and spindle $b$; hereby the drawing rod $a$ is actuated and the brake-blocks are thus tightly pressed toward the wheels.

In order to release the brake-blocks at first they are loosened by turning the crank in the opposite direction, and thereafter they are removed from the wheels by lying over the crank in the position shown in dotted lines.

In order to prevent an accidental or unintended turning over of the crank, the eccentric or cam $e$ to which is articulated the one end of the link $g$, is arranged somewhat at a distance from the axis $f'$ of the spindle $c\,b$ toward the crank so that the latter is fixed by the pull or strain of the block-connecting-rods; besides I may place a spring $l$ between a ring $k$ of the spindle $b$ and the lower extremity of the stationary socket $d$, which spring has the tendency to press down the spindle $b$ and effects thus a strain upon the link $g$, so that hereby and by the eccentric position of the pivot $g^2$ as mentioned above the crank is maintained in its position and may be laid over but with little expenditure of force by overcoming the spring $l$.

It is obvious that the details of construction, especially the form of the link $g$, crank $f$, head $d'$ and the mounting of the socket $d$ in the tube $h$ may be widely varied without departing from the nature of my said invention.

I claim—

1. In a rapid acting brake the combination of a crank $f$ provided with a cam $e$, link $g$ and spindle $c\ b$, said crank being adapted to be laid over; substantially as described and for the purpose specified.

2. In a quick acting brake the combination of a crank $f$, pivoted about a bolt $f'$ and articulated to a link $g$, the same being articulated in its turn eccentrically to the axis of the pivot, as set forth and for the purpose specified.

In testimony whereof I have signed this specification in presence of two subscribing witnesses.

CARL KEINER.

Witnesses:
W. THEODOROVIC,
BELMONT.